United States Patent
Moorehead

(10) Patent No.: US 11,220,240 B1
(45) Date of Patent: Jan. 11, 2022

(54) WINDSHIELD WIPER PROTECTIVE BOOT

(71) Applicant: Darron T. Moorehead, St. Louis, MO (US)

(72) Inventor: Darron T. Moorehead, St. Louis, MO (US)

( * ) Notice: Subject to any disclaimer, the term of this patent is extended or adjusted under 35 U.S.C. 154(b) by 447 days.

(21) Appl. No.: 15/294,690

(22) Filed: Oct. 15, 2016

Related U.S. Application Data

(60) Provisional application No. 62/242,555, filed on Oct. 16, 2015.

(51) Int. Cl.
*B60S 1/04* (2006.01)
*B60S 1/40* (2006.01)
*B60J 11/06* (2006.01)
*B60S 1/38* (2006.01)

(52) U.S. Cl.
CPC ............. *B60S 1/0491* (2013.01); *B60S 1/40* (2013.01); *B60J 11/06* (2013.01); *B60S 2001/3843* (2013.01)

(58) Field of Classification Search
CPC ........ B60S 1/0491; B60S 1/40; B60S 1/0497; B60S 2001/3843; B65D 37/00; B60J 11/06
USPC ................. 15/250.001, 257.01; D12/20, 220; 206/8, 9, 11, 278–299, 315.2–315.8
See application file for complete search history.

(56) References Cited

U.S. PATENT DOCUMENTS

| | | | | |
|---|---|---|---|---|
| 2,138,610 A | * | 11/1938 | Overly | A47G 25/54 112/417 |
| 5,412,177 A | * | 5/1995 | Clark | B60S 1/38 15/250.07 |
| 6,070,287 A | | 6/2000 | Kornegay | |
| 6,327,738 B1 | * | 12/2001 | Lewis | B60S 1/38 15/250.001 |
| D586,716 S | | 2/2009 | Radfar | |
| 8,393,046 B2 | * | 3/2013 | Schneider | B60S 1/583 15/250.001 |
| 8,556,337 B1 | * | 10/2013 | Cornitius-Cary | A47C 7/021 224/275 |
| 8,844,588 B2 | | 9/2014 | Low et al. | |
| 9,434,515 B2 | | 9/2016 | Sparenberg, Sr. | |
| 2003/0106895 A1 | * | 6/2003 | Kalal | B65D 21/086 220/9.2 |
| 2005/0235448 A1 | | 10/2005 | Richard | |
| 2011/0073033 A1 | * | 3/2011 | Novack, IV | B63B 59/045 114/361 |
| 2011/0192511 A1 | * | 8/2011 | Marrone | B60J 11/06 150/166 |
| 2013/0000802 A1 | | 1/2013 | Rees | |
| 2014/0250623 A1 | | 9/2014 | Hochertz et al. | |

* cited by examiner

Primary Examiner — Katina N. Henson
(74) Attorney, Agent, or Firm — Grace J. Fishel

(57) ABSTRACT

A windshield wiper boot having an open end, closed end and closed sides configured for installation over a windshield wiper assembly and wiper arm in rest position. The windshield wiper boot is formed from a folded panel of PVC coated nylon which is hemmed at the open end and raw edge finished along the opposite end and side with a binder. Stacked raw edges under the binder provide a waterproof seal.

1 Claim, 3 Drawing Sheets

WINDSHIELD WIPER PROTECTIVE BOOT

BACKGROUND OF THE INVENTION

Field of the Invention

The present invention relates to a windshield wiper boot that protects a windshield wiper from moisture and has sufficient body to facilitate application to a windshield wiper.

Brief Description of the Prior Art

Windshield wiper blades are expensive and susceptible to damage by snow and ice and excessive heat. There have been protective sleeves proposed in the past but they have been ineffective at keeping the windshield wiper dry and have included straps or other attachment means which discouraged use.

BRIEF SUMMARY OF THE INVENTION

In view of the above, it is an object of the present invention to provide a windshield wiper boot that protects a windshield wiper from moisture. It is another object to provide a windshield wiper boot that has an open end that can be easily slipped over the windshield wiper without the need for closure means. Other objects and features of the invention will be in part apparent and in part pointed out hereinafter.

In accordance with the invention, a windshield wiper boot is provided for use on a windshield wiper assembly including a wiper blade pivoted on a wiper arm. The boot has a length greater than the length of the windshield wiper assembly and a width such that the windshield wiper boot covers the windshield wiper assembly and a portion of the wiper arm when the windshield wiper boot is slip fitted over the windshield wiper assembly. The boot has an open end and a closed opposite end and closed sides and is formed of a rectangular sheet of PVC coated nylon hemmed at one end and having raw edges along the opposite end and side. The rectangular sheet is folded over with the PCV coated side of the sheet opposing and with the raw edges stacked along the opposite end and side. The stacked raw edges are sealed together with a raw edge binder in manner that a waterproof seal is formed between the PVC coated side of the sheet under the binder.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
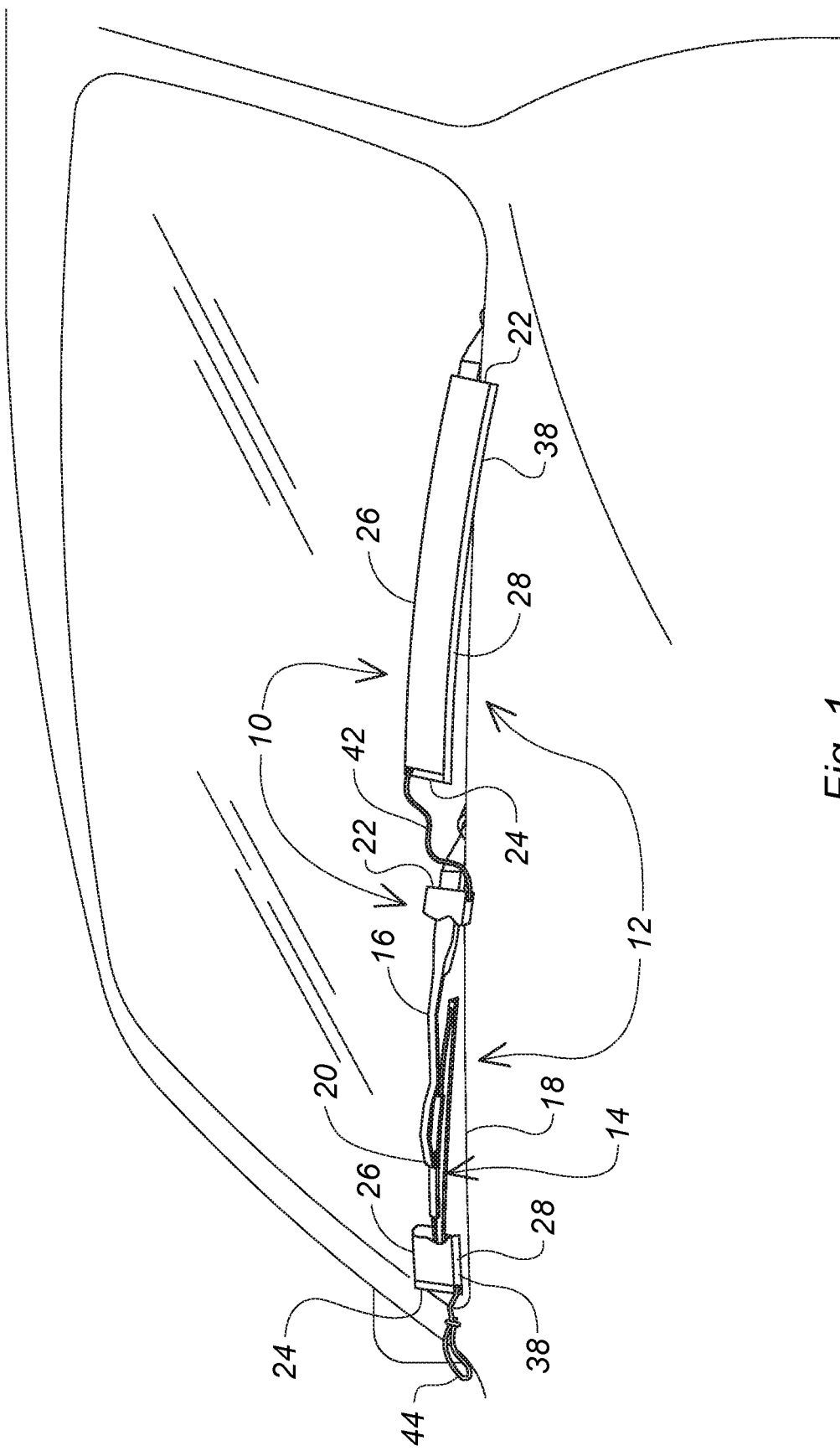
FIG. 1 is a perspective view showing an assembly of first and second windshield wiper boots in accordance with the present invention.

Referring to the drawings more particularly by reference character starting with FIG. 1, reference numeral 10 refers to a windshield wiper boot in accordance with the invention shown installed on a pair of windshield wipers 12. Each of windshield wipers 12 includes a windshield wiper assembly 14 for holding a wiper blade and a wiper arm 16 which is connected at the base of a windshield 18 to a motor (not shown). Windshield wiper assembly 14 is pivoted 20 to wiper arm 16. While primarily for use on automobiles, windshield wiper boot 10 may be used on other vehicles having windshields such as a truck, recreational vehicle, boat, plane, etc.

With continuing reference to FIG. 1, windshield wiper boot 10 is an elongated member with an open end 22, a closed opposite end 24 and closed sides 26, 28. Windshield wiper boot 10 has a length greater than the length of windshield wiper assembly 14 for complete coverage and a width such that it may be slip fitted over windshield wiper assembly 14 and a portion of wiper arm 16 sloped in rest position.

Figure 2:
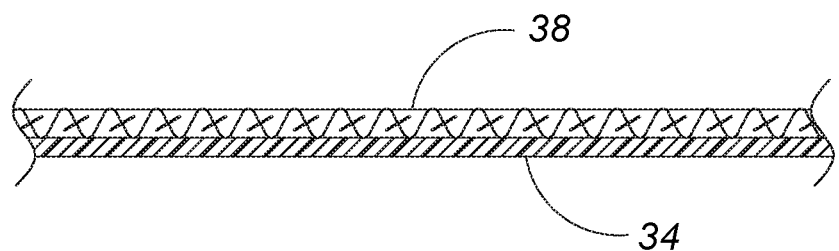
FIG. 2 is a cross-section of the material from which the windshield wiper boots are formed.
Figure 3:
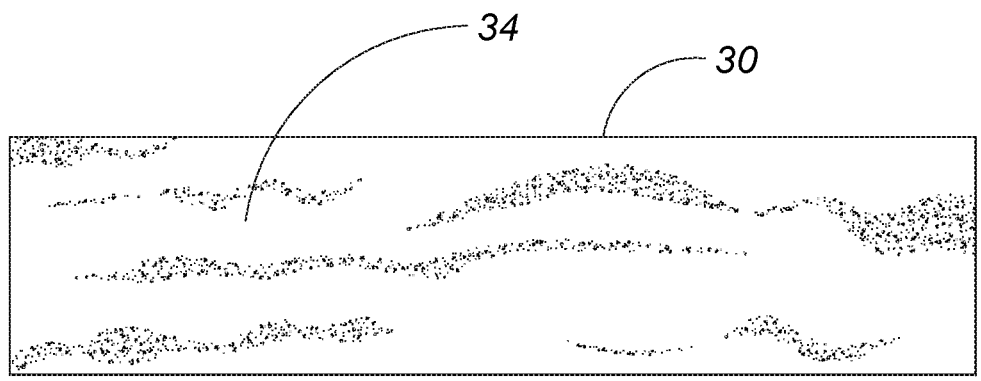
FIG. 3 is a plan view of a sheet of material from which a windshield wiper boot is formed.
Figure 4:
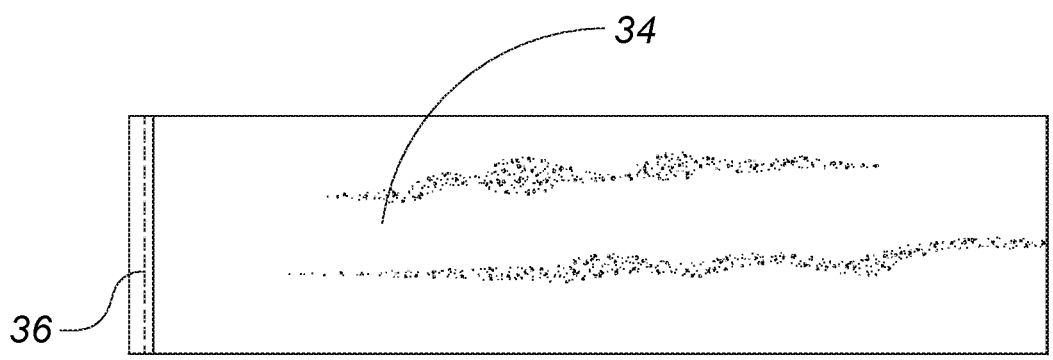
FIG. 4 is a plan view of the sheet with a stitched turned under hem formed at a first end.
Figure 5:
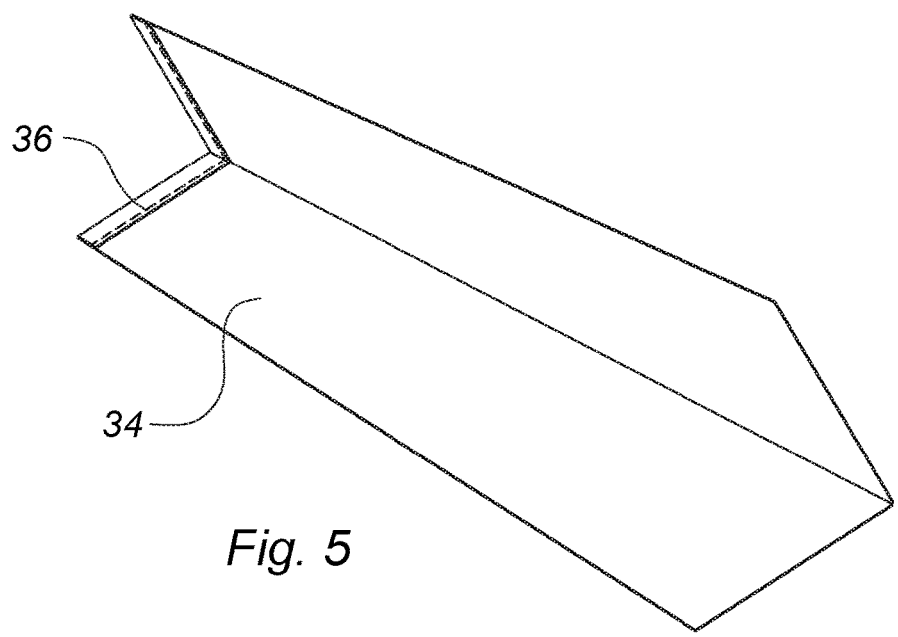
FIG. 5 is a perspective of the sheet of material being folded in half.
Figure 6:
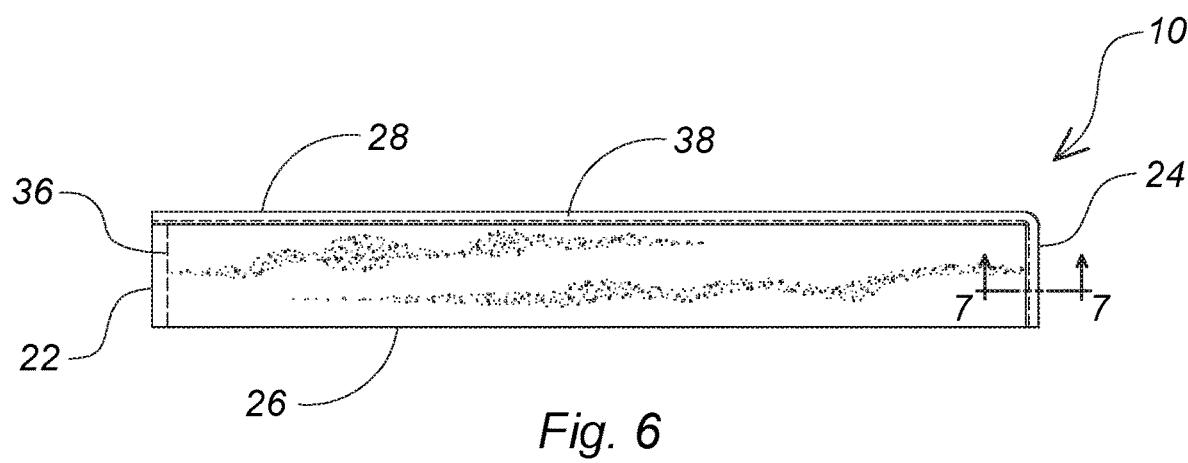
FIG. 6 is a plan view of the folded sheet of material with a raw edge binder around the open side and open end; and, FIG. 7 is a cross-section taken along the plane of 7-7 in FIG. 6 showing the stacked raw edges of the folded sheet under the binder.
Figure 7:
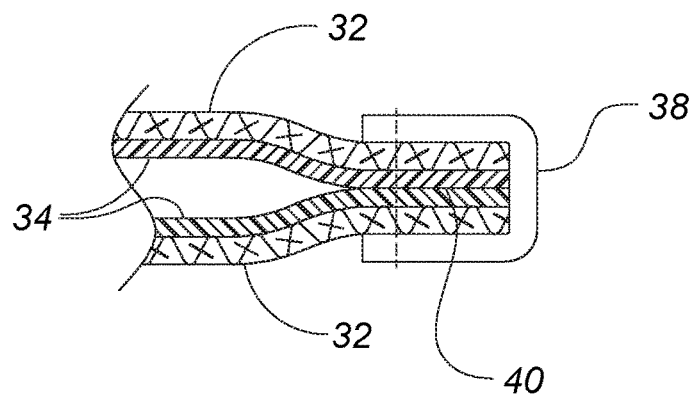

Windshield wiper boot 10 is formed from a rectangular sheet 30 as shown in FIG. 3. Sheet 30 comprises nylon 32 coated with PVC 34 as shown in FIG. 2. Nylon 32 is durable and has good resistance to abrasion and has been used in other wiper blade covers. While nylon is moisture resistant to some degree it does absorb water and has a soft hand. That is a problem as a nylon wiper blade cover allows water to seep through that at low temperatures may freeze to windshield wiper assembly 14 and may cause more damage in being pulled loose than if no cover had been provided. The addition of a PVC coat 34 to the underside of the nylon 32 addresses the moisture problem and in addition gives the panel sufficient body that windshield wiper boot 10 substantially retains its shape and does not flop over as it is being installed. A 70 denier PVC backed nylon taffeta has been found entirely satisfactory but it will be understood that windshield wiper boot 10 is not limited to that particular PVC coated nylon.

Sheet 30 is hemmed 36 along open end 22 and has raw edges along an opposite end 24 and side 28. The hemmed sheet is folded over as shown in FIG. 8 with the PVC coated sides facing inward and with the raw edges stacked along closed end 24 and side 28. Opposite end 24 and side 28 are given a raw edge finish with a stitched binder 38. The length of a contact area 40 under binder 38 which is pressed together with stitching forms a PVC waterproof seal and completes the enclosure.

In an embodiment of windshield wiper boot 10, sheet 30 is 30" by 7 ¾". Windshield wiper boots 10 having a length of about 23", 25" and 28" fit most vehicles. But windshield wiper boots 10 may be made longer and wider for larger windshield wipers of vehicles such as vans, trucks, buses, airplane, etc. Windshield wiper boots 10 can be made shorter and narrower for windshield wiper assemblies such as commonly found on the rear windshields of sport utility vehicles and the like.

In use while a vehicle is in parked state, open end of windshield wiper boot 10 is slipped over a distal end of windshield wiper assembly 14, passed over pivot 20 and over a proximal end of windshield wiper assembly and a portion of wiper arm 16. Because windshield wiper assembly and wiper arm 16 are angled in rest position, it is unnecessary to close open end 22 of windshield wiper boot 10 to keep moisture out. This important feature facilitates both installation and removal of windshield wiper boot 10 prior to driving the vehicle. While the primary use of windshield wiper boot 10 is in harsh winter conditions, it can be used in the summer as a sunscreen to provide UV protection and prevent the rubber wiper blades from melting and sticking to the windshield in high heat conditions.

As shown in FIG. 1, first and second windshield wiper boots 10 are linked together with a cord 42 passing from binder 38 of open end 22 of the boot on the left to folded side 26 at closed end 24 of the boot on the right. The right windshield wiper boot is installed first and the left boot installed last. A cord 44 is provided on closed end 24 of the left boot such that the covers may be pulled off as a unit from one side of the vehicle. On larger vehicles, linking the boots together is particularly advantageous as the user does not need to go around the vehicle to pull them off individually. It is also advantageous to a user who cannot reach across the windshield of a smaller vehicle.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A first and second windshield wiper boot for a windshield wiper assembly comprising a wiper blade carried by a wiper arm, said windshield wiper assembly pivotably mounted on the wiper arm; each of said boots having a length greater than a length of the windshield wiper assembly and a width such that the windshield wiper boot covers the windshield wiper assembly and a portion of the wiper arm when the windshield wiper boot is slip fitted over the windshield wiper assembly, each of said boots having an interior with an open end and an opposite end, said boots comprising a rectangular sheet of nylon coated on one side with PVC and hemmed at the open end, said sheet having raw edges along the opposite end and sides, said raw edges stacked along the opposite end and sides with the PVC side of the rectangular sheets facing the interior, a raw edge binder stitching said stacked raw edges together, said stacked raw edges under the raw edge binder providing a waterproof seal in the interior and forming a closed bottom end and sides; and an assembly including the first and second windshield wiper boots linked together with a first cord, said first cord attached to the binding along the side at the open end of the first windshield wiper boot and to a folded over side of the second windshield wiper boot, a second cord attached to the binding at the closed bottom end of the first windshield wiper boot for use in pulling the assembly off the first and second windshield wipers in a longitudinal direction.

* * * * *